(12) United States Patent
Niemann et al.

(10) Patent No.: US 8,681,138 B2
(45) Date of Patent: Mar. 25, 2014

(54) METHOD AND DEVICE FOR MEASURING LIGHT CONDITIONS IN AN AUTOMOBILE FOR DETERMINING A CONTROL SIGNAL

(75) Inventors: Thomas Niemann, Delmenhorst (DE); Almut Schlarmann, Bremen (DE); Christin Nitsche, Bremen (DE)

(73) Assignee: Hella KGaA Hueck & Co., Lippstadt (DE)

( * ) Notice: Subject to any disclaimer, the term of this patent is extended or adjusted under 35 U.S.C. 154(b) by 198 days.

(21) Appl. No.: 13/241,723

(22) Filed: Sep. 23, 2011

(65) Prior Publication Data

US 2012/0092315 A1    Apr. 19, 2012

(30) Foreign Application Priority Data

Sep. 24, 2010 (DE) .......................... 10 2010 046 393
Nov. 11, 2010 (DE) .......................... 10 2010 051 138

(51) Int. Cl.
*G06F 3/038* (2013.01)
*G09G 5/00* (2006.01)
*B60Q 1/00* (2006.01)

(52) U.S. Cl.
USPC ............................ 345/207; 340/438; 340/441

(58) Field of Classification Search
USPC ................... 348/602; 359/630; 340/438, 441; 345/207
See application file for complete search history.

(56) References Cited

U.S. PATENT DOCUMENTS

| 4,717,935 | A | 1/1988 | Anacreon |
| 5,732,293 | A | 3/1998 | Nonaka et al. |
| 2001/0003558 | A1 | 6/2001 | Hirai et al. |
| 2005/0281549 | A1 | 12/2005 | Shih et al. |
| 2008/0218501 | A1* | 9/2008 | Diamond ...................... 345/207 |
| 2009/0174647 | A1* | 7/2009 | Chen et al. ................... 345/102 |
| 2009/0237381 | A1* | 9/2009 | Otani et al. ................... 345/207 |

FOREIGN PATENT DOCUMENTS

DE        4024011        1/1992

* cited by examiner

*Primary Examiner* — Bipin Shalwala
*Assistant Examiner* — Hang Lin
(74) *Attorney, Agent, or Firm* — Muncy, Geissler, Olds & Lowe, P.C.

(57) ABSTRACT

In a method for determining a control signal as a function of measured ambient light conditions for subsequent processing by at least one electrical component, in particular in order to control an imaging unit of an image output apparatus, the present light conditions are detected by means of a plurality of light sensors, measuring signals are output as a function of the intensity of the light conditions recorded by the light sensors, and the measuring signals of the individual light sensors are then combined into at least one control signal in accordance with at least one predefined ratio. The control signal is adjusted with consideration of the orientation of at least one of the light sensors and is then output.

9 Claims, 2 Drawing Sheets

Figure 1:
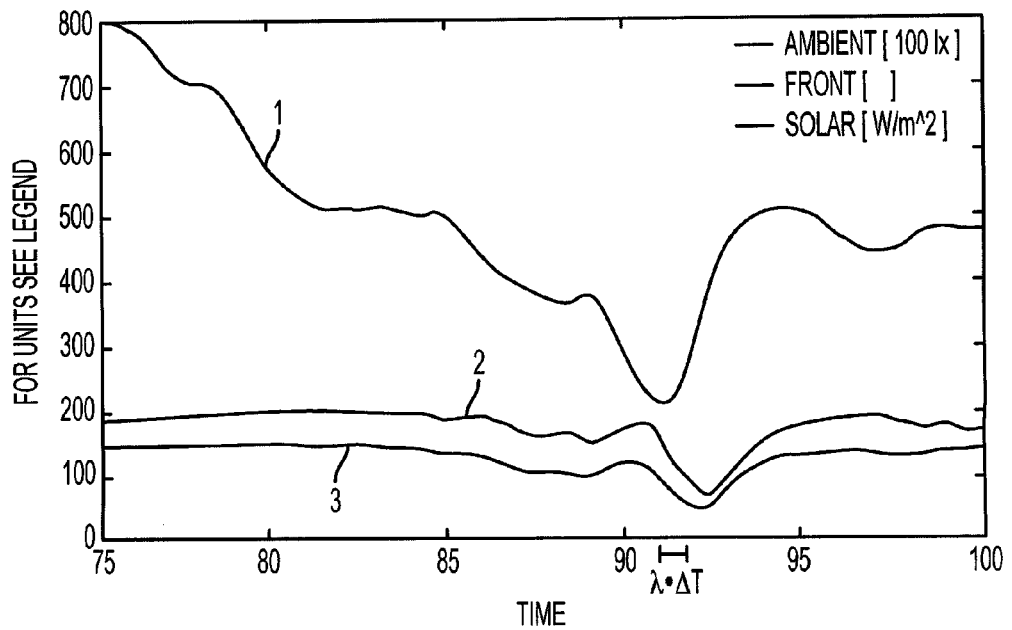

METHOD AND DEVICE FOR MEASURING LIGHT CONDITIONS IN AN AUTOMOBILE FOR DETERMINING A CONTROL SIGNAL

The invention relates to a method for determining a control signal as a function of measured ambient light conditions for subsequent processing by at least one electrical component, in particular in order to control an imaging unit of an image output apparatus. The invention further relates to a device for determining a control signal for an electrical component, in particular a control signal for an imaging unit of an image output apparatus, comprising at least one light sensor and comprising an evaluation unit.

Methods and devices of the previously known type are normally used to supply a control signal to an imaging unit of an image output apparatus, for example the imager of a head-up display in a motor vehicle. For example, the brightness of the image output apparatus can be matched via the control signal to the light conditions present outside the vehicle. In particular with relatively high luminous intensities, the full readability or recognisability of the image data projected via the output apparatus, often onto a windscreen, is thus to be ensured. Furthermore, the brightness is also adjusted at relatively low luminous intensities, such as when driving at night, so as not to dazzle the driver of the vehicle and thus not to further restrict his ability to see in darkness.

Methods and devices of the aforementioned type generally use a near-field signal which is output by a near-field sensor, wherein the near-field sensor detects the light conditions in the closer environment, for example of a motor vehicle, and also adjusts the brightness of the image output apparatus. Such a near-field sensor is normally arranged in the region of the front windscreen of a motor vehicle, reliable control signals only being output from said sensor, however, if the angle of inclination of the front windscreen is between 22 degrees and 26 degrees. If the incline of the windscreen extends in a planar and steep manner, the near-field sensor no longer functions reliably, since it no longer detects the defined near field and the light conditions, typical for this field, in front of a vehicle.

The object of the invention is to improve a method and a device of the aforementioned type so that the control signal can always be determined in a reliable and simultaneously simple manner.

The object is achieved in accordance with the method and device of the present invention.

A method for determining a control signal as a function of measured ambient light conditions for subsequent processing by at least one electrical component is provided, in particular in order to control an imaging unit of an image output apparatus, in which method the prevailing light conditions are detected by means of a plurality of light sensors, measuring signals are output as a function of the intensity of the light conditions recorded by the light sensors, and then the measuring signals of the individual light sensors are combined, at least into one control signal, in accordance with at least one predefined ratio.

With the aid of such a method according to the invention and its method steps running in a predetermined sequence, a control signal can be determined in an advantageously simple manner, in particular in order to control an imaging unit of an image output apparatus. It is thus advantageously possible to dispense with the identification of this control signal using a near-field light sensor required exclusively for this purpose. The light conditions are first recorded via the different light sensors, in particular via the detection ranges thereof, which each perform different fundamental primary functions and are generally orientated differently from one another. Measuring signals, for example in the form of electrical signals of corresponding size, are then transmitted from the light sensors to, for example, an evaluation unit as a function of the intensity of the recorded electromagnetic radiation, such as visible light or IR radiation. The control signal is then calculated from the measuring signals of the different light sensors, wherein the measuring signals of the different light sensors have a different weighting in the calculation in accordance with a predefined ratio.

In accordance with a development of the invention, the control signal is advantageously adjusted under consideration of the orientation of at least one of the light sensors and is then output for subsequent processing. Owing to the deviating angles of inclination of the front windscreens among the different manufacturers of motor vehicles and the resultant different orientations of the light sensors detecting the light conditions, it is necessary to adjust the control signal. At least one variable, for example the identified front signal or the ambient light signal, measured directly by at least one light sensor can be adjusted by a predefined factor or parameter before the control signal is calculated from the measured variables or signals. A subsequent adjustment of the control signal already calculated is likewise conceivable, wherein the control signal calculated from the measuring signals of the light sensors then forms a function or equation with a factor. The magnitude of each of the factors to be taken into account is always dependent on the inclination of the front windscreen. Instead of a mathematical adjustment, the intensity of the radiation measured by the light sensors may optionally be influenced by a cover part which has a masking effect and thus, from the outset, limits the proportion of the radiation becoming effective on the sensor surface.

The light conditions detected by means of the light sensors are preferably recorded at different distances and/or in different spectral ranges. In addition to the light conditions present directly around a motor vehicle, which often change erratically during driving, for example as a result of bridges, the light conditions at some distances in the direction of travel in front of the motor vehicle are also taken into account for determination of the control signal in accordance with the invention. Inter alia, the brightness of an image output apparatus used in a motor vehicle, for example a head-up display, can thus be adjusted in good time to changing light conditions so that an improved display of the output images is ensured. The light conditions present above a vehicle and the light conditions provided at a distance of approximately 50 m in front of the vehicle are preferably consulted for this purpose. Furthermore, a distinction is also made between visible light and infrared radiation during the calculation.

In particular, the control signal is calculated as a function of measured ambient light with different ratios of the detected measuring signals to one another. This affords the advantage that an advantageous adjustment of the modelled control signal to a control signal generated in an otherwise conventional manner with a near-field light sensor is possible, the measurement curves of which exhibit negligible deviations from one another on comparison. The light conditions are graduated or divided into specific areas so that a distinction can be made in particular between a number of different illumination states, in each of which predetermined intensities of illumination dominate. In particular, a distinction is made between at least two day states, at least two twilight states and at least two night states, in each of which the measuring signals output when calculating the control signal from the front light sensor, the ambient light sensor and the solar sensor have a different weighting. Each of the at least six primary states may also have up to two sub-states.

In accordance with a development of the invention, a time-difference signal is additionally used to calculate the control signal and is calculated in the sequence of changing measuring signals from a time interval detected between at least two different light sensors. Particularly in the case of a motor vehicle moving at conventionally different speeds, the sensitivity or speed with which the calculated or modelled control signal then changes can be adjusted via the time-difference signal dependent on the travelling speed of said motor vehicle.

In a device for determining a control signal for an electrical component, in particular a control signal for an imaging unit of an image output apparatus, comprising at least one light sensor and at least one evaluation unit for which independent protection is required, in accordance with the invention a plurality of light sensors for measuring the light conditions are coupled in a signal-transmitting manner to the evaluation unit, wherein a control signal is calculated by means of the evaluation unit on the basis of the measuring signals output at the light sensors with a predetermined ratio of the measuring signals to one another.

With such a device according to the invention, the control signal can advantageously easily be determined, wherein, as a result of the calculation of the control signal with the aid of the evaluation unit which in particular is coupled in a data-transmitting manner to at least one front light sensor, at least one ambient light sensor and least one solar sensor, it is possible to advantageously dispense with the use of a near-field light sensor which is otherwise required separately to determine the control signal. Moreover, a simplified design of the device is provided and therefore the costs of production thereof are simultaneously reduced. The measuring signals output by the light sensors are in particular weighted differently by means of the evaluation unit, which may comprise at least one computation circuit, and therefore the control signal is always formed from a predetermined ratio of the measuring signals to one another.

Furthermore, the evaluation unit comprises at least one computation circuit with an adjustment function for a varying orientation of the light sensors. A detection range, for example of a front light sensor or a solar sensor, which changes by altering the position of the light sensors can thus advantageously be compensated for in a simple manner. Different orientations of the light sensors occur in particular with use of the device according to the invention in motor vehicles made by different manufacturers, since their front windscreens have different angles of inclination and therefore the detection ranges are pivoted through a predetermined number of degrees. Even a small change in position has a not insignificant influence on the light sensors, which falsifies the measured values thereof. With the device according to the invention the control signals can now be determined without difficulty on front windscreens using the light sensors of said device, the angle of inclination of said windscreens being between 22° and 32° to the surface normal. In the case of windscreen inclinations greater than 32°, fundamental functions of the light sensors can no longer be implemented with the aid of the device, but the light sensors can be used without difficulty to model a control signal which is used, for example, to control the brightness of a head-up display.

Within the scope of the invention at least two of the light sensors have differently orientated detection ranges. A light sensor used as an ambient light sensor has a relatively broad, upwardly directed detection cone, by means of which the light conditions present above a motor vehicle can be detected, for example. In contrast to the ambient light sensor, a further light sensor designed as a front light sensor has a relatively narrow, approximately horizontally formed detection cone which normally points on a vehicle in the direction of travel so as to detect in good time any shaded portions of the road. Both sensors detect visible light in particular.

In accordance with another development of the invention at least two of the light sensors have different measuring ranges for detecting different frequency ranges of the radiation to be measured. At least one light sensor is advantageously used, of which the measuring range in particular lies within the frequency range of visible light, and a further light sensor is also used of which the measuring range lies in the frequency range of infrared radiation. The light sensor designed in particular as a solar sensor for detecting infrared radiation preferably comprises an approximately vertically, upwardly orientated detection range in order to detect, in a relatively simple manner, in particular the IR radiation which is incident in conjunction with solar radiation.

In accordance with the invention, in a motor vehicle comprising at least one image output apparatus for which independent protection is also required, wherein the image output apparatus comprises at least one imaging unit, the imaging unit is coupled in a signal-transmitting manner to a device.

In a motor vehicle comprising such a device according to the invention for determining in particular a control signal for an imaging unit of an image output apparatus, such as a head-up display, the brightness of said image output apparatus can always advantageously be adjusted in a simple manner as a function of the changes to the light conditions around the motor vehicle occurring during driving. The imaging unit is also likewise adjusted as a function of the current vehicle speed. At least one rain light sensor is included in the development of such a device according to the invention and comprises at least one front sensor, at least one ambient sensor and at least one solar sensor.

Figure 2:
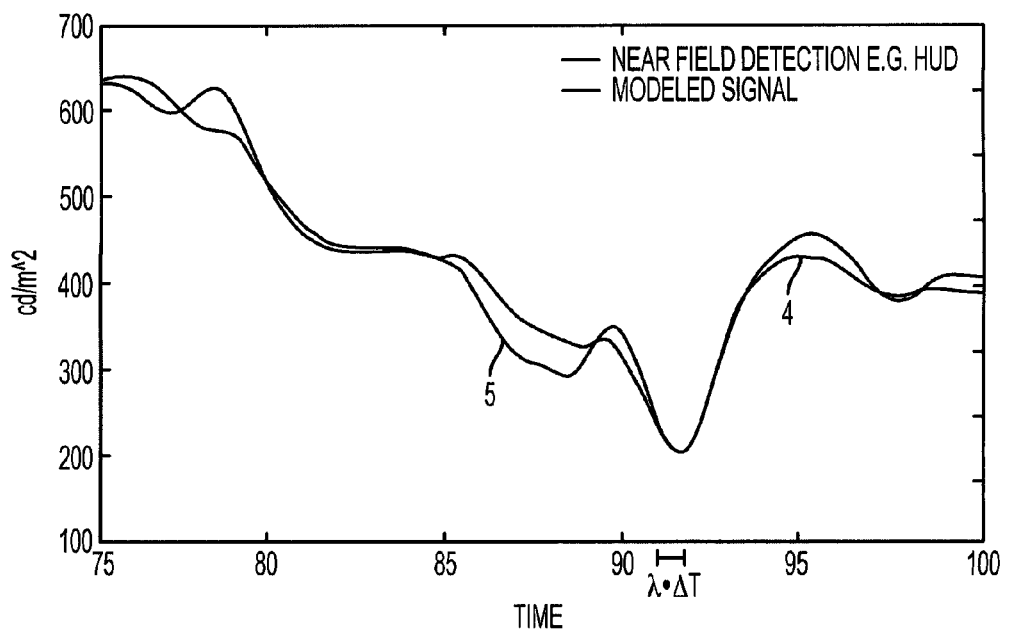
Figure 3:
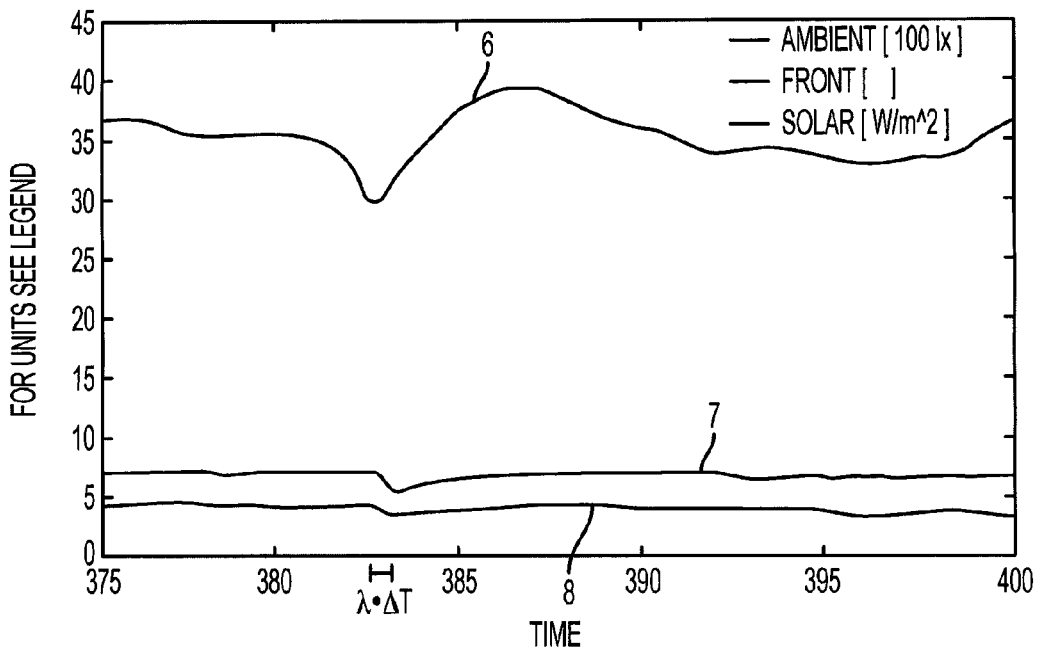

The measurements, from which further inventive features emerge, taken for example in conjunction with implementation of the method according to the invention are illustrated in the drawings, in which:

FIG. 1 shows a measurement of the light sensors during the day;

FIG. 2: shows a measured near-field signal and a modelled near-field signal from the measuring signals according to FIG. 1;

FIG. 3: shows a measurement of the light sensors during a twilight state; and

Figure 4:
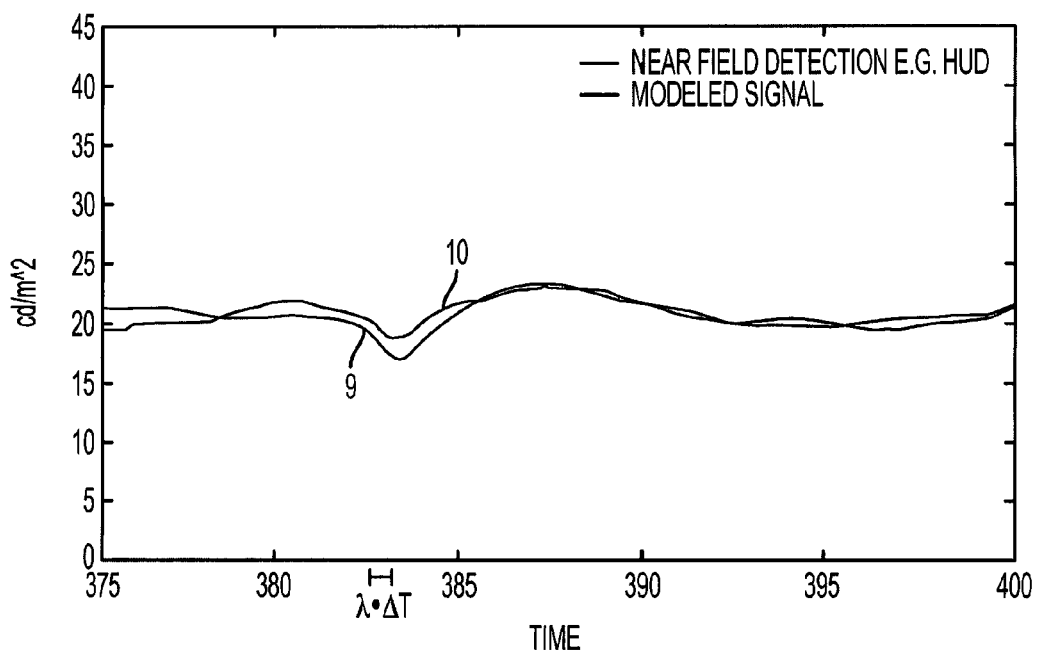

FIG. 4: shows a measured near-field signal and a modelled near-field signal from the measuring signals according to FIG. 3.

FIG. 1 shows an example of a measurement during the day, wherein the measurement curve 1 recorded via a front light sensor, the measurement curve 2 recorded via an ambient light sensor, and the measurement curve 3 ascertained by means of a solar sensor are plotted over time. The "day" illumination state, which is defined for an illumination intensity between 1200 and 25400 lux, is shown during driving over a bridge. The rough moment of driving over the bridge can be identified, in particular, by the strongly falling measurement curves. Owing to the further measuring range of the front light sensor directed in a forward-facing manner, the measurement curve 1 of said sensor exhibits a temporally offset fall compared to measurement curves 2 and 3, of which the detection ranges lie directly in the ambient surroundings of the motor vehicle. A time-difference signal delta T can be determined from this temporal offset, of which the magnitude varies as a function of driving speed and, at the same time, the sensitivity or reaction speed of the modelled near-field signal shown in FIG. 2 as a computation curve 4 is changed with the aid of a computation circuit which determines the calculated near-field signal. By comparison, a conventionally measured near-field signal is also shown as a measurement curve 5 in addition to the modelled near-field signal. The computation curve 4 and the measurement curve 5 only exhibit small deviations from one another. The modelled near-field signal can, for example, be composed as follows during the "day" illumination state: approximately 20% ambient light, approximately 10% solar radiation and approximately 70% front signal.

FIGS. 3 and 4 show the "twilight" illumination state, which in the present case is defined for an illumination intensity between 400 and 1200 lux. The light signals measured for the modelling of the near-field signal are again shown in FIG. 3, wherein the measurement curve 6 represents the front light signal, the measurement curve 7 represents the ambient light signal and the measurement curve 8 represents the solar signal. The measurement curves also show a moment of driving over a bridge at the same speed as that during the measurement shown in FIGS. 1 and 2. Owing to the much reduced light intensity during twilight, the changes to the measuring signals and therefore the change over a respective measurement curve 6 to 8 are much smaller, which is also reflected in the computation curve 9 of the modelled near-field signal. As indicated by the comparison measurement of the measurement curve 10, also shown in FIG. 4, of the near-field signal measured by means of a near-field light sensor, both curves extend very close to one another. The weighting for the calculation of the modelled near-field signal is changed compared to the "day" illumination state, wherein the near-field signal is now formed as follows, for example, during the "twilight" illumination state: approximately 15% ambient light, approximately 25% solar radiation and approximately 60% front signal.

The invention claimed is:

1. A method for determining a control signal as a function of measured ambient light conditions for controlling an imaging unit or an image output apparatus in a motor vehicle, wherein the present light conditions are detected by means of a plurality of light sensors, measuring signals are output as a function of an intensity of the light conditions recorded by the light sensors, and the measuring signals of the individual light sensors are then combined into at least one control signal in accordance with at least one predefined ratio,
   whereby in order to calculate the control signal, a time-difference signal is additionally used which is identified in a sequence of changing measuring signals from a time interval detected between at least two different light sensors of said plurality of light sensors, including an ambient light sensor and a front light sensor, and whereby the time-difference signal is dependent on a traveling speed of the vehicle.

2. The method according to claim 1, wherein the control signal is adjusted under consideration of the orientation of at least one of the light sensors and is then output.

3. The method according to either claim 1, wherein the light conditions detected by means of the light sensors are recorded at one of different distances and in different spectral ranges.

4. The method according to claim 1, wherein the control signal is calculated as a function of the measured ambient light with different ratios of the detected measuring signals to one another.

5. A device for determining a control signal for an imaging unit of an image output apparatus for a motor vehicle, comprising at least one light sensor and at least one evaluation unit, wherein a plurality of light sensors for measuring the light conditions are coupled in a signal-transmitting manner to the evaluation unit, a control signal being calculated by means of the evaluation unit on a basis of a measuring signals output at the light sensors with a predetermined ratio of measuring signals to one another,
   whereby in order to calculate the control signal, a time-difference signal is additionally used which is identified in a sequence of changing measuring signals from a time interval detected between at least two different light sensors of said plurality of light sensors, including an ambient light sensor and a front light sensor, and whereby the time-difference signal is dependent on a traveling speed of the vehicle.

6. The device according to claim 5, wherein the evaluation unit comprises a computation circuit with an adjustment function for a varying orientation of the light sensors.

7. The device according to claim 5, wherein at least two of the light sensors have differently orientated detection ranges.

8. The device according to claim 5, wherein at least two of the light sensors comprise different measuring ranges for detecting different frequency ranges.

9. A motor vehicle comprising at least one image output apparatus which comprises at least one imaging unit, wherein the imaging unit is coupled in a signal-transmitting manner to a device according to claim 5.

* * * * *